W. M. DEMING.
DOUBLE CAPSULE.
APPLICATION FILED FEB. 28, 1920.
1,419,618.
Patented June 13, 1922.
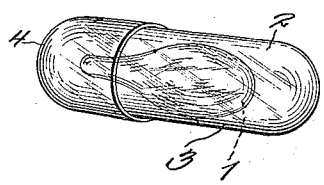
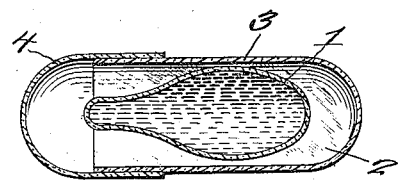
Inventor
William M. Deming,
By Watson E. Coleman
Attorney

UNITED STATES PATENT OFFICE.

WILLIAM M. DEMING, OF FAIRVIEW, MONTANA.

DOUBLE CAPSULE.

1,419,618.  Specification of Letters Patent. Patented June 13, 1922.

Application filed February 28, 1920. Serial No. 362,158.

*To all whom it may concern:*

Be it known that I, WILLIAM M. DEMING, a citizen of the United States, residing at Fairview, in the county of Richland and State of Montana, have invented certain new and useful Improvements in Double Capsules, of which the following is a specification, reference being had to the accompanying drawings.

Heretofore soft capsules have been used for administering medicine to various animals, particularly to horses, by using what may be termed a dosing device or gun. By this means considerable trouble has been experienced, owing to the soft capsules becoming jammed in the barrel of the gun during its travel therefrom and at the time of expelling them and also due to the soft capsule becoming swelled from its contact with any soft substance, say for instance, the walls of the throat of the animal, thereby preventing the proper delivery of the capsule into the animal.

The present invention aims to entirely overcome these disadvantages in delivering medicine containing capsules into the animal by encasing the soft capsule into a relatively larger hard capsule, thereby protecting the encased capsule, and preventing the jamming or the lodging of the capsule in the gun barrel or in the throat of the animal, and also preventing the swelling of the soft capsule.

It has been found that a hard capsule cannot be used to contain the medicine without the use of the soft inner capsule, since the medicine is in liquid form, and will leak from where the closure fits the body of the hard capsule, and furthermore the liquid would tend to soften the hard capsule.

However, with the use of a hard capsule to encase a soft capsule (which is made in one piece) there is no chance for the liquid to escape into the hard capsule, so as to leak at the point where the closure of the hard capsule fits the body thereof. The hard capsule will have a free passage through the barrel of the gun or the dosing device, and will not jam, owing to the surface of the hard capsule being smooth and not sticky. Furthermore, the hard capsule will more readily pass through the throat passage or canal and eventually reach the stomach and become dissolved, in which case the soft capsule will dissolve and permit the medicine to act upon the desired parts of the animal's body.

An object is to eliminate the waste of medicine, the danger of the capsule becoming wedged or jammed in the dosing device, overcome the breaking of the capsule in the mouth as well as make it easier to administer the medicine and to lengthen the life of the soft capsule, in other words, to preserve the soft capsule until it is used.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a view in perspective of the capsule constructed in accordance with the invention; and Figure 2 is a sectional view through the same.

Referring to the drawings, 1 designates a soft capsule, which may be made of any suitable soft material, preferably gelatin or any like material which is soluble when brought into contact with the heat of the interior of the body. This soft capsule may be made any shape or configuration, preferably such as that illustrated, and is adapted to contain the medicine to be administered to the animal, such as a horse. This soft capsule is, as shown, encased in a larger capsule 2, which likewise may be constructed of any suitable soluble material or substance, preferably gelatin. This larger capsule, however, though it be constructed of gelatin is harder than the inner soft capsule, in fact it is stiff and rigid, as well as smooth so it will easily pass through the bore of the barrel of the gun, and will not jam during the travel through the barrel of the gun. Furthermore, owing to this particular construction, the larger capsule will very easily pass through the throat, and without sticking or lodging, and will eventually reach the stomach. The outer capsule will then become solvent as well as the inner capsule.

The outer capsule may be made any suitable size or configuration, and comprises the body section 3 and the closure section 4 which telescopically engages the body section. By means of this larger hard capsule, the soft capsule is well protected, and furthermore the life thereof is considerably lengthened or preserved, until it is used. Furthermore, by this larger capsule, the soft capsule is prevented from breaking in the mouth of the animal as well as prevented from swelling due to contacting with the throat or the mouth of the animal. In short, this manner of encasing a soft capsule permits the same to have an uninterrupted passage from the barrel of the gun or the dosing device to and through the mouth of the animal, until the capsule reaches the part of the body for which it is intended.

In administering medicine to animals it has been found essential to employ double containers, in order to attain the best results. It has also been found that containers of this character become crushed before reaching their destination, therefore failing to accomplish the greatest good, and in proper time. In other words some containers, either double or single become collapsed due to contact within the sides of the wall of the passage from the mouth to the stomach, or the container becoming either dissolved or compressed enough to cause the container to burst, which will cause the medicine to discharge in the passage, instead of in the stomach, necessitating the fluid wiping the wall of the passage in its further travel to the stomach. Very often the medicine to be administered to animals has a burning effect, and therefore will be injurious to the walls of the passage. The medicinal properties of the medicine would not be effective when the medicine wipes the walls of the passage, as would be the case, if the medicine reached the stomach in its full proportions, however in the stomach the medicinal properties of the medicine would be absorbed by the walls of the stomach, as well as being carried off to parts, for which the medicinal properties are intended to cure. In the present case it is the aim to provide a double container, wherein the wall of the outer container is not so easily collapsed or crushed, and in order to accomplish this the outer container or capsule has its opposite ends semi-spherical shaped, and it has been found that such a construction will more readily stand the pressure of the passage walls, and would tend to support the wall of outer container between its ends. Furthermore in this device, the outer container is constructed of two sections telescopically united, and where they are united, the outer container will more readily stand the pressure. Applicant is well aware that capsules or medicine containers such as the outer container in the present case have been used, and it is well known that a construction of container of this kind more readily stands the pressure of the walls of the passage through which it passes, and furthermore applicant does not broadly claim a single capsule or container, but as an article of manufacture applicant claims a double container. Applicant is also well aware that soft soluble capsules have been used, but such capsules easily become crushed and collapsed when passing through the passage from the mouth to the stomach and furthermore as these soft soluble containers or capsules are constructed of material such as gelatin or the like, they will adhere or stick to the throat, or to the side of the passage, and therefore will not produce the greatest good. Therefore, the aim of the present invention is to house a soft soluble capsule, and in housing the same, to keep the wall of the housing container a relatively substantial distance from the wall of the soft soluble capsule or container, therefore giving the outer container or capsule sufficient room to slightly collapse that is a point between the ends thereof. Furthermore, being that the outer container or capsule has spherical opposite ends, is constructed of relatively hard soluble material, it will pass through the passage without sticking, so that when it reaches the stomach or its destination, and becomes dissolved, the medicine of the soft soluble capsule will be enabled to produce the desired results.

The invention having been set forth, what is claimed as new and useful is:

An article of manufacture, for administering medicine internally to the lower animals, adapted to be delivered by means of a balling gun beyond the swallowing muscles of the throat, comprising an encasing capsule constructed of relatively hard gelatin and being of a size to fit within and ejected from said balling gun, and a relatively soft gelatin capsule, and adapted to contain medicine, said soft capsule being smaller than and loosely housed in the hard capsule, whereby the inner capsule is permitted of a varying contact with the wall of the relatively hard capsule.

In testimony whereof I hereunto affix my signature.

WILLIAM M. DEMING.